2,457,157

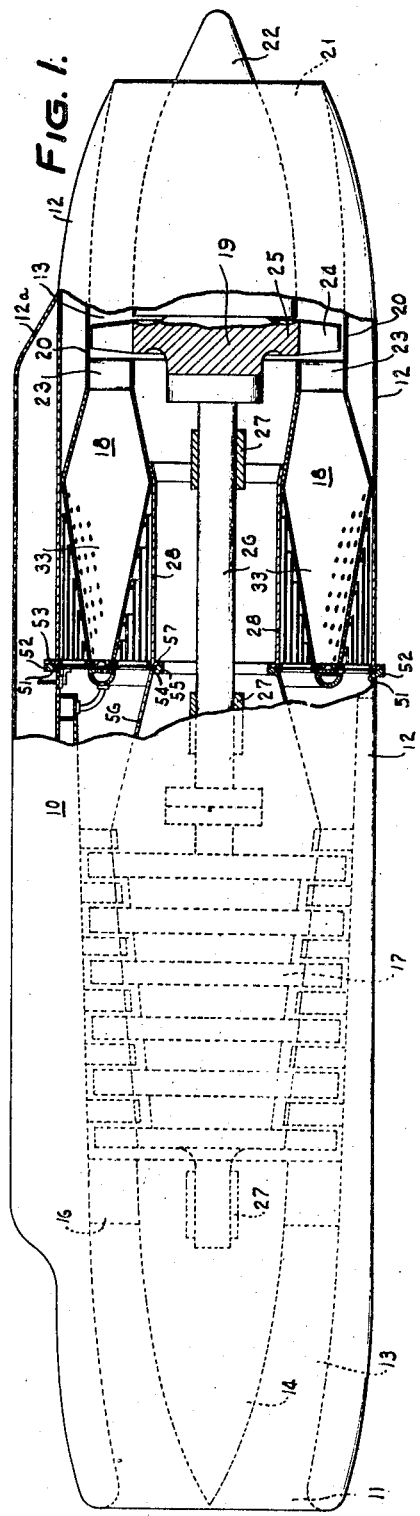
Dec. 28, 1948.  A. S. KING, JR  2,457,157
TURBINE APPARATUS
Filed July 30, 1946  2 Sheets-Sheet 1
INVENTOR
ALEXANDER S. KING JR.
BY
ATTORNEY Dec. 28, 1948.  A. S. KING, JR  2,457,157
TURBINE APPARATUS
Filed July 30, 1946  2 Sheets-Sheet 2
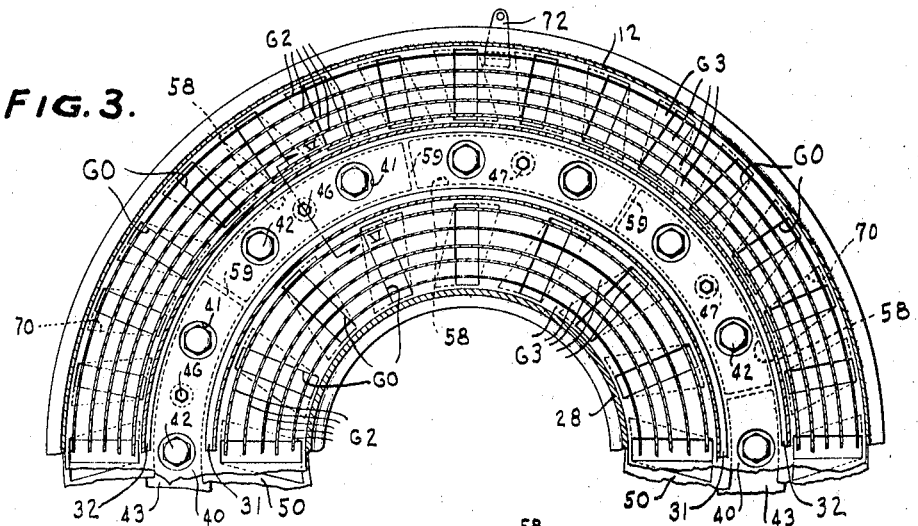
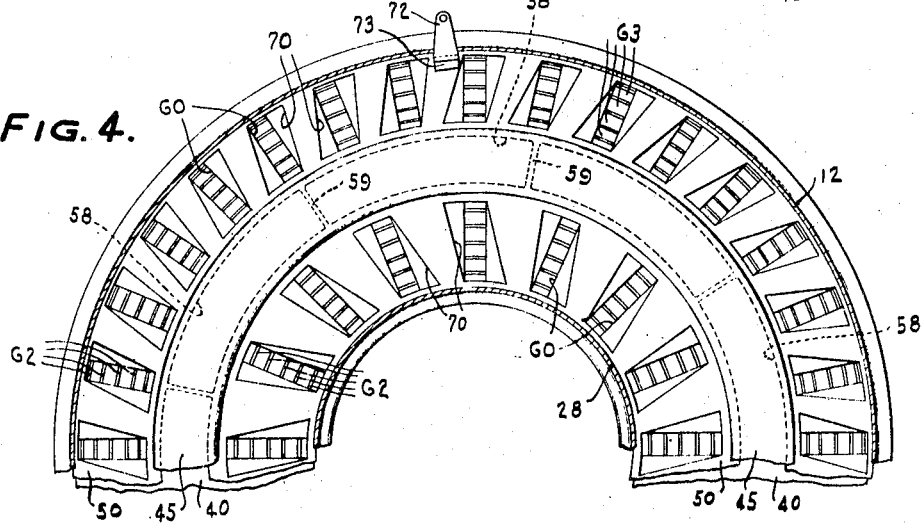
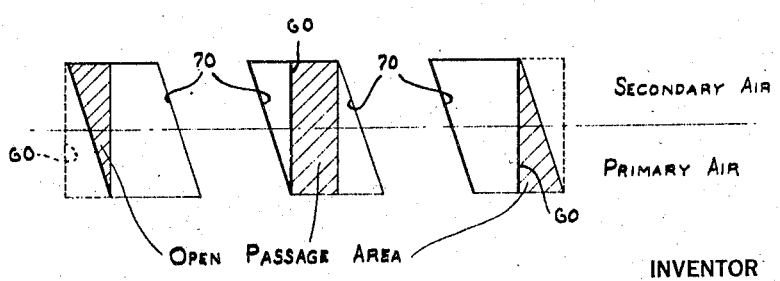
WITNESSES:
INVENTOR
ALEXANDER S. KING Jr.
BY
ATTORNEY Patented Dec. 28, 1948

UNITED STATES PATENT OFFICE 2,457,157

TURBINE APPARATUS

Alexander S. King, Jr., Prospect Park, Pa., assignor to Westinghouse Electric Corporation, East Pittsburgh, Pa., a corporation of Pennsylvania Application July 30, 1946, Serial No. 687,193

3 Claims. (Cl. 263—19)

This invention relates to combustion apparatus, more particularly to the air supply therefor, and has for an object to provide novel structure of this character.

Another object of the invention is to provide, in combination with a combustion chamber to which primary and secondary air are admitted, means for varying the relative quantities of primary and secondary air admitted to the combustion chamber.

A further object of the invention is to provide a combustion chamber having separate means for admitting air to different zones thereof, together with means for proportioning the air admitted to each zone by said means.

Yet another object of the invention is to provide a combustion chamber having zones admission of air thereto, together with means for varying the relative quantities of air admitted to the different zones.

These and other objects are effected by the invention as will be apparent from the following description and claims taken in connection with the accompanying drawings, forming a part of this application, in which:

Fig. 1 is a side elevational view of a gas turbine power plant incorporating the present invention, a portion of the outer casing and part of the inner structure being broken away to better illustrate the novel features;

Fig. 2 is an enlarged longitudinal sectional view of one-half of a combustion chamber such as shown in the power plant of Fig. 1;

Fig. 3 is a transverse sectional view, taken along the line III—III of Fig. 2, looking in the direction indicated by the arrows;

Fig. 4 is a transverse sectional view, taken along the line IV—IV of Fig. 2, looking in the direction indicated by the arrows;

Fig. 5 is an enlarged fragmentary sectional view, taken along the line V—V of Fig. 3, looking in the direction indicated by the arrows; and, Fig. 6 is a diagrammatic view of the air admission parts of the present invention.

The present invention, although not limited thereto, is particularly adapted for use with a gas turbine power plant of the type employed on aircraft to drive the propeller on an electric generator or to supply motive fluid for jet propulsion of the aircraft. Such a plant preferably comprises a streamlined tubular casing having mounted axially therein a compressor adjacent the forward or inlet end, a turbine adjacent the rearward or discharge end, and combustion apparatus located between the compressor and the turbine for heating the compressed air and which discharges the hot gases at suitable temperature and pressure to the turbine. The gases on leaving the turbine are discharged through a nozzle provided at the rear of the casing and may aid in propelling the aircraft.

Referring now to the drawings more in detail, the power plant shown in Fig. 1 and indicated in its entirety by the reference character 10, is adapted to be mounted in or on the fuselage or wing of an aircraft with the intake 11, or left end, as viewed in this figure, pointed in the direction of flight.

The plant comprises an outer shell or casing structure 12—12a providing an annular air duct or passage 13 extending fore and aft with respect to the aircraft. This casing has mounted therein, along its longitudinal axis, a fairing cone 14 adapted to house gearing connecting through a hollow guide vane 16 with auxiliaries (not shown) disposed in the casing 12a, an axial flow compressor 17, combustion apparatus indicated generally 18, a turbine 19 which drives the compressor, and a nozzle 21 defined by the inner wall 20 of the casing 12 and by a tailpiece 22, the latter being mounted concentrically in the casing and cooperating with the latter to provide the propulsion nozzle.

Air enters the intake 11 and flows substantially straight through the plant, passing through the compressor 17, where its pressure is raised, and into the combustion apparatus 18, where it is heated. The hot gases, comprising the products of combustion and excess air heated by the combustion, on leaving the combustion apparatus are directed by suitable guide vanes or nozzles 23 against the blades 24 of the turbine disc 25, and then are discharged through the propulsion nozzle 21 to propel the aircraft.

By reference to Fig. 1, it will be seen that the compressor and turbine rotors are interconnected by means of a shaft 26 supported by suitable bearings 27 and enclosed by an inner wall structure, generally indicated 28, which protects the shaft and bearings from high temperatures and also defines a portion of the annular air flow passage 13 in which the combustion apparatus 18 is disposed.

The present invention is not limited to the specific details or arrangements of structure thus far described, but is primarily concerned with the combustion apparatus, indicated generally at 18.

A pair of frusto-conical inner and outer wall members 31 and 32, respectively, separate the annular flow passage 13, at the region of the combustion apparatus 10, into an annular burner or combustion space 33 overlapped both inwardly and outwardly by annular air spaces 34 and 35, respectively. The inner wall 31 is disposed with its base or larger end upstream and the outer wall 32 has its larger end or base downstream, with the result that the burner space 33 defined thereby increases in cross-sectional area from its upstream end to its downstream end, conversely, the inner and outer overlapping air spaces 34 and 35, the former defined by the walls 28 and 31 and the latter by the walls 12 and 32, decrease in cross-sectional area from their upstream ends to their downstream ends.

Both the inner and the outer walls 31 and 32, respectively, are provided with numerous openings 38 therethrough for flow of air to the burner space 33 from the overlapping air spaces 34 and 35.

The upstream ends of the burner space 33 and of the overlapping air spaces 34 and 35 are closed by an annular header plate 40 (Fig. 2) whose inner periphery abuts the wall 28 and whose outer periphery abuts the wall or casing 12. The outer periphery abuts the wall or casing 12. The header plate 40 is provided, midway of its inner and outer peripheries, with an annular series of openings 41 for passage of fuel atomizing nozzles 42 mounted in the flat downstream wall 43 of the fuel manifold 44 whose upstream wall 45 is curved or streamlined to facilitate division and passage of the air streams at either side thereof to the inner and outer air spaces 34 and 35, respectively.

The fuel manifold 44 is secured to the header plate 40 by bolts 46 threaded in spacer lugs 47 integral with the fuel manifold wall 43 (Fig. 5).

An annular lantern valve plate 50 is disposed adjacent the upstream face of the header plate 40 with its outer periphery rotatably received in a recess 51 provided in the flange 52 at the rear end of the forward section of outer casing 12, the flange 52 being secured to the mating flange 53 at the forward end of the aft section of outer casing 12. Similarly, the inner periphery of the valve plate 50 is adapted to rotate in the recess 54 provided in the flange 55 at the rear end of wall 56, this flange 55 being secured to the mating flange 57 at the forward end of wall 28 (Fig. 1.)

In the region of the fuel nozzles 42, the valve plate 50 is provided with elongated arcuate openings 58, separated by struts 59, (Figs. 3 and 4). The length of the spacer studs 47 is slightly greater than the thickness of the lantern valve plate 50, so that the portions of the valve plate which lie between the header plate 40 and the fuel manifold downstream wall 43 may rotate freely.

The header plate 40 is provided with inner and outer annular rows of openings 60 for admission of air to the overlapping air spaces 34 and 35, respectively, these openings 60 preferably being rectangular, as indicated in Figs. 3 and 4, and being of a radial extent corresponding to the radial dimension of the air spaces at their upstream ends. The air spaces 34 and 35 are divided radially by cylindrical partitions 62 into annular passages 63. The upstream ends of these cylindrical partitions may be secured to the header plate 40 and their downstream ends may be secured to reinforcing ribs or rings 64 which are secured to the air-space sides of the inner and outer walls 31 and 32.

Thus, all air entering the air spaces 34 and 35 through the header plate openings 60 is directed by the partitions 62 to different portions of the burner space walls 31 and 32, the air flowing through the shorter annular passages 63 nearest the fuel manifold 44 entering the burner space 33 in the vicinity of the nozzles and constituting primary air, and the air flowing through the longer annular passages 63 farthest from the fuel manifold entering the burner space farther downstream and constituting secondary mixing and cooling air.

In actual flight, the combustion conditions vary with changes in altitude and changes in engine operating speeds. Consequently, optimum combustion can be obtained for a wider range of operating conditions if the ratio of primary to secondary air can be varied than is obtainable with the fixed ratio heretofore provided.

To effect the desired variation in ratio of primary and secondary air, the lantern valve plate 50 is provided with inner and outer annular series of openings 70 corresponding in number and spacing to the number and spacing of the openings 60 in the header plate 40. The valve plate 50 is rotatable, within limits, relative to the header plate 40 and the openings 70 in the valve plate 50 are sloping parallelograms of such size and shape that at the mid-point of valve adjustment the openings 60 in the header plate are fully opened, which at one limit of adjustment most of the air is supplied to the longer secondary air passages 63, and at the opposite limit of adjustment most of the air is admitted to the shorter primary air passages 63 (Fig. 6).

Obviously, the valve plate 50 may be moved to any desired position of adjustment intermediate the two limits mentioned. Movement of the valve plate is affected at will by the operator through suitable control linkage or other mechanism (not shown) connecting with lever 72 secured to the valve plate 50 by the bracket 73 (Fig. 2). The lever 72 has limited circumferential movement in a slot 74 in the casing 12, and leakage of air through this slot is prevented by a sliding plate 75 carried by the bracket 73 and engaging the inner surface of the slotted wall 12. (Fig. 2).

While I have shown the invention in but one form, it will be obvious to those skilled in the art that it is not so limited, but is susceptible of various changes and modifications without departing from the spirit thereof.

What is claimed is:

1. In combustion apparatus, wall structure defining a combustion chamber, said wall structure including an annular wall increasing in diameter from the upstream end of the combustion chamber towards the downstream end thereof and separating said combustion chamber from an overlapping air space, said annular wall having longitudinally-spaced groups of openings for admission of air from said overlapping air space to said combustion chamber, the groups communicating with the upstream portion of said chamber admitting primary air and the groups communicating with the downstream portion of said chamber admitting secondary air; partition structure separating said overlapping air space into passages each communicating with a different group of said air admission openings and comprising a plurality of cylinders of different diameters concentric about the annular wall with their downstream ends adjacent the latter intermediate the longitudinally-spaced groups of air admission openings; and valve means for controlling admission of air to said passages, said valve means being adjustable to vary the ratio of primary and secondary air admitted through said passages.

2. In combustion apparatus, wall structure defining a combustion chamber and an overlapping air space; means separating said air space into a plurality of passages whose upstream ends are radially aligned and whose downstream ends communicate with the combustion chamber, certain of said passages being adapted to conduct primary air to the combustion chamber and the remainder of said passages being adapted to conduct secondary air to said combustion chamber; and a disc-type lantern valve controlling entrance of air to the radially-aligned upstream ends of said passages and adjustable between limits, at one of said limits the majority of air entering the primary air passages and at the other of said limits the majority of air entering the secondary air passages.

3. In combustion apparatus, wall structure defining a combustion chamber, said wall structure including an annular wall separating said combustion chamber from an overlapping air space, said annular wall being substantially frusto-conical with its smaller end at the upstream end of the combustion chamber and its larger end at the downstream end of said combustion chamber and having longitudinally-spaced groups of openings providing for admission of primary air to the upstream region of the combustion chamber and of secondary air to the downstream portion of said chamber; partition structure comprising a plurality of nested cylinders of different diameters concentric about the annular wall with their downstream ends associated with said wall at points between the longitudinally-spaced groups of air admission openings, whereby the spaces between said cylinders provide annular passages for flow of primary and secondary air to the combustion chamber; and valve means associated with the upstream ends of said passages for controlling the flow of air therethrough, said valve means comprising a radially-disposed header having an annular series of air ports therein aligned with the upstream ends of the annular passages, and a valve plate associated with said header and rotatable relative thereto between limits, said valve plate having an annular series of openings therein whose shape differs from that of the openings in the header, said shapes being so related that at one limit of rotation of the valve plate relative to the header, the major portion of the air ports uncovered by the valve plate openings communicates with the primary air passages, at the other limit of rotation of the valve plate relative to the header the major portion of the air ports uncovered by the valve plate openings communicates with the secondary air passages, and at a position of rotation intermediate said two limits of rotation the primary and secondary air passage portions of the air ports uncovered by the valve plate openings are substantially equal.

ALEXANDER S. KING, JR.

REFERENCES CITED

The following references are of record in the file of this patent:

UNITED STATES PATENTS

| Number | Name | Date |
|---|---|---|
| 1,069,243 | Fogler | Aug. 5, 1913 |
| 2,042,834 | Rippe | Dec. 17, 1935 |
| 2,033,010 | Russell | Mar. 3, 1936 |
| 2,117,270 | Bloom | May 17, 1938 |